UNITED STATES PATENT OFFICE.

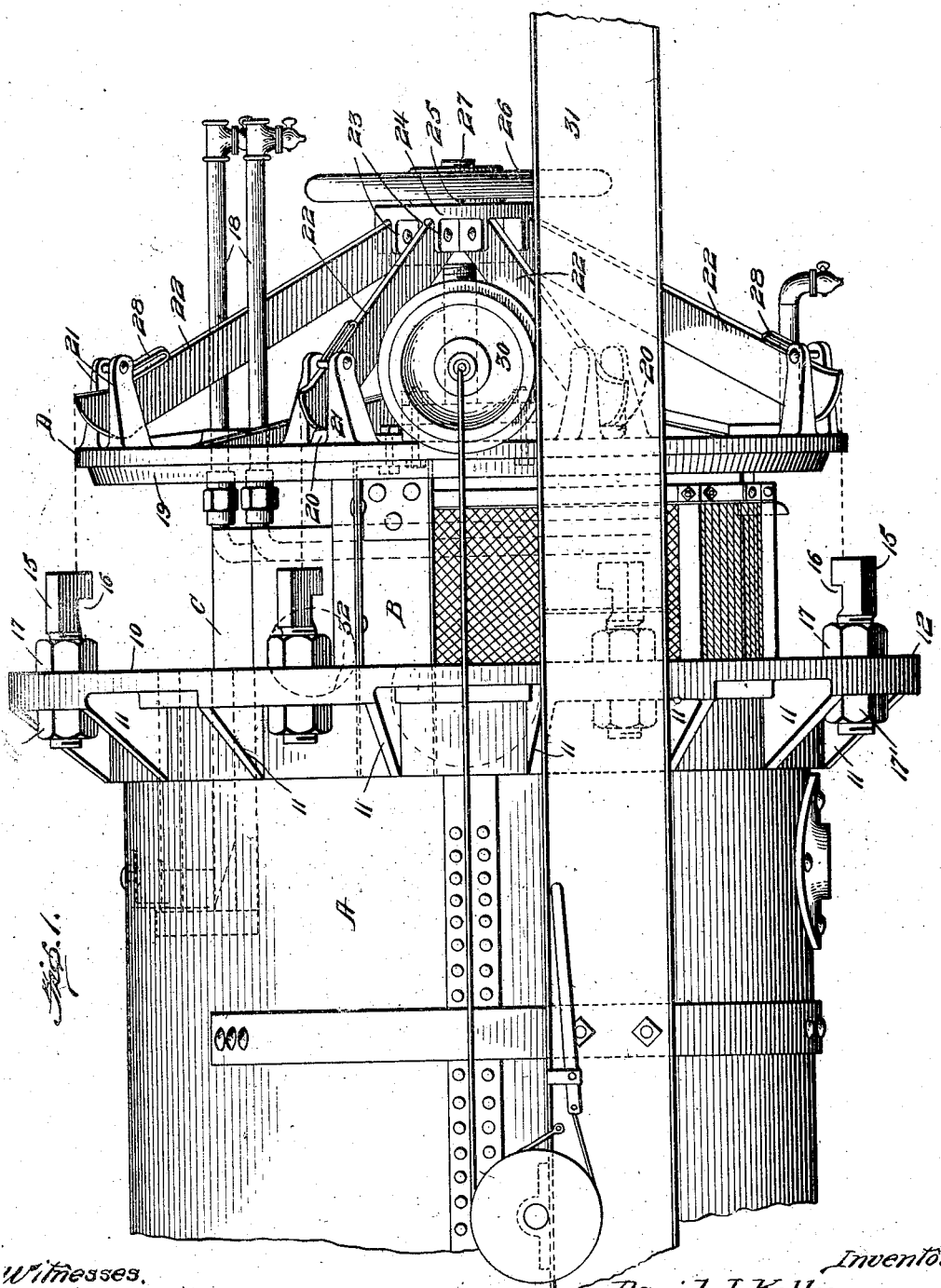

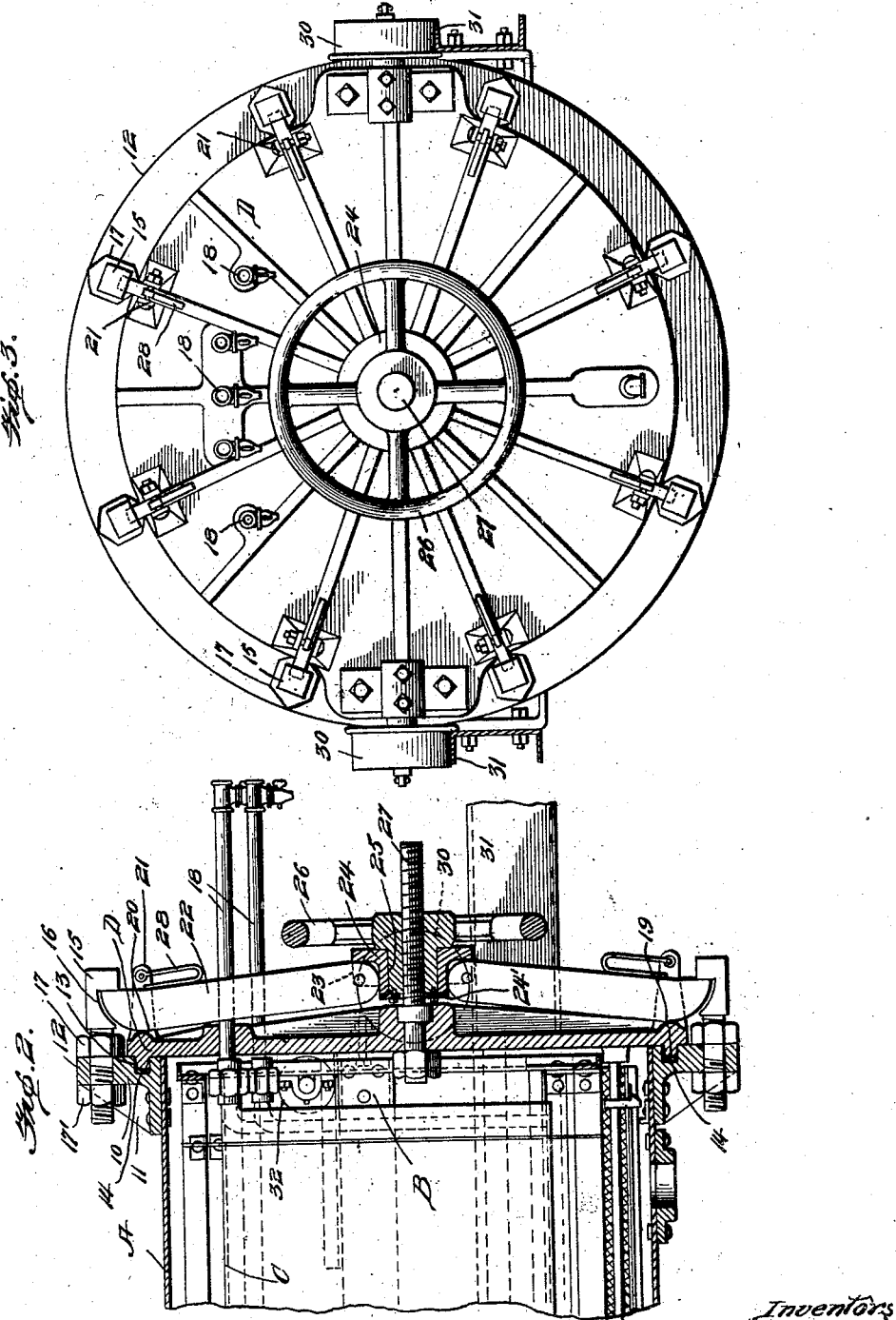

DAVID J. KELLY AND JOHN M. CALLOW, OF SALT LAKE CITY, UTAH, ASSIGNORS TO THE KELLY FILTER PRESS CO., OF SALT LAKE CITY, UTAH, A CORPORATION OF UTAH.

SLIMES-FILTERING APPARATUS.

No. 865,912.          Specification of Letters Patent.          Patented Sept. 10, 1907.

Application filed December 5, 1906. Serial No. 346,416.

*To all whom it may concern:*

Be it known that we, DAVID J. KELLY and JOHN M. CALLOW, citizens of the United States, residing at Salt Lake City, in the county of Salt Lake and State of Utah, have invented new and useful Improvements in Slimes-Filtering Apparatus, of which the following is a specification.

Our invention relates to certain new and useful improvements in apparatus designed to separate solid matter, of whatever nature, from liquids, the apparatus being particularly useful in the art of separating slimes from which precious metals have been dissolved and the liquid which holds the precious metals in solution; the invention being also useful in the sugar making industry for removing the precipitate of calcium carbonate resulting from the purification, in carbonators, of sugar juice. It is also useful in what is known as the "Steffans process" for filtering out the solid material, calcium saccharate.

The present improvement has relation more particularly to the construction in the aforesaid type of apparatus of a locking-head connection between the pressure tank and the filter-frame carriage by which a perfectly tight joint is formed around the open end of the tank to prevent any leakage at this point, and to securely lock the filter-frame carriage in its position in the tank.

Our invention consists of the parts and the construction, arrangement and combination of parts which we will hereinafter describe and claim.

In the accompanying drawings forming part of this specification and in which similar reference characters indicate like parts in the several views: Figure 1, is a side elevation of the front end of a pressure-tank showing the head thereof unlocked and with its attached filter-frame carriage, partly withdrawn therefrom. Fig. 2, is a vertical sectional view of Fig. 1. Fig. 3, is an end view.

In a prior patent No. 815,021, dated March 13, 1906 and in a former application Serial Number 330,009, filed August 10, 1906 by David J. Kelly, there are disclosed an apparatus for the filtration of slimes or solids from fluid matter, which apparatus comprises among its essential parts, the tank A, the traveling filter carriage B, the filters C, carried by the carriage and an exterior trackway upon which the carriage with its filter frames is run out of the tank when the filters are heavily or more or less fully charged with separated solid matter and it is desired to remove the collected solid matter from the sides of the filter frames. As these features are fully described in the aforesaid prior patent and application, and as the present improvement relates particularly to the locking-head connection between the tank and the front end of the filter frame carriage, we deem it unnecessary in the present instance to give a detailed description or illustration of said features.

At the front or open end of the tank A is fixed an annular casting or ring 10 which is preferably angular in cross-section with reinforcing or bracing webs 11 and an outstanding portion 12 having an annular groove 13 which is exterior to and concentric with the open end of the tank, said groove containing, preferably, a gasket 14. The outstanding portion 12 of the casting or ring 10 is pierced at points to receive the threaded stems of the lugs 15 whose front portions are recessed at 16 and whose stems are engaged by securing and jam nuts 17 and 17' whereby said lugs are firmly bolted to the ring.

The filter frame carriage B is, preferably, of the construction set forth in detail in the aforesaid prior patent and application, and it contains and carries the filters C upon the outside of whose foraminous or filter sides the solid matter is separated from the liquid, the liquid passing through the filter sides to the interior of the filters and thence through pipes 18 to the outside of the apparatus for final delivery, in the manner described in the aforesaid patent and application or in any other well known and appropriate manner.

The filter-frame carriage has rigidly connected to it the head D which forms the closure for the open end of the tank A when the carriage is run back into the tank and the parts are in their operative filtering position, as in Fig. 2. This head D is preferably, a rigid casting having on its inner face an annular rib or flange 19 which is designed to enter the annular groove or channel in the outstanding part of the ring 10 on the front end of the tank, said head having on its outer face suitable fulcrum lugs 20, as shown in Fig. 2 which lugs are contained between spaced lugs or ears 21 projecting from the front face of the head and between which ears or lugs 21 the outer ends of suitable levers 22 operate and are slidably guided.

The levers 22 are radially disposed and have their inner ends pivotally connected between spaced lugs 23 made rigid with a collar 24 which is loosely mounted on the extended and reduced hub portion 25 of a hand wheel 26 internally threaded to engage a screw 27 bolted to the central portion of the head and extending outwardly therefrom centrally of the series of radial levers.

The collar 24 is retained in its proper position on the hub of the hand wheel by a retaining ring 24' bolted to the rear end of said hub portion and a free movement is allowed the collar relative to the hand wheel.

The inner ends of the radial levers are preferably rounded and fit in recesses or sockets formed between the spaced ears or lugs 23 and the flange of the collar 24;

the outer ends of the levers are curved on their rear edges to facilitate the sliding motion on the fulcrums. The corresponding curvature of the wall of the recess in the locking bolts is to accommodate this curvature and the opposite or front edge of said levers backs squarely against the flat front wall of the recess as shown.

In addition to the foregoing, we employ springs 28 which press against the outer edges of the levers substantially in line with the fulcrum lugs 20 to thereby maintain the fulcrum points of said levers against the lugs. The specific form of spring shown is a bent plate one end of which is contained between and fixed to the outer ends of the spaced guide lugs 21 while the other end is designed to bear against the back edge of the lever.

The filter frame carriage is provided with supporting wheels 30 which travel upon the trackways D and said carriage has the small rollers 32 engaging the internal tracks of the tank, as in the aforesaid prior patent and application.

The operation of the foregoing parts is substantially as follows: The filter carriage being partly or wholly withdrawn from the tank and it being desired to secure it in the tank and to tightly close the open end of said tank, the said carriage is run back into the tank by appropriate means, the hand wheel being first run out on the screw 27 to retract the radial levers to allow their outer ends to pass the lugs 15 when the head is retracted against the open end of the tank. Then the hand wheel is turned to cause it to run back on the screw, the collar 24 being caused to slide towards the head during this operation, and the levers are caused to slide outwardly on the fulcrum points and slidably engage the locking lugs and thereby force the head tightly against the ring 10 of the tank with the annular flange 19 of said head seated tightly against the gasket in the groove or channel of the ring.

We are aware that it is not broadly new to employ with an open-ended tank, a head and radially disposed levers engaging lugs on the tank, and a follower to operate said levers to cause them to fulcrum on the head and thereby force the head against the open end of a tank and such invention we do not broadly claim:

In the present invention we pivot the levers to a collar which is slidably mounted on the central screw, the said collar being without axial movement, therefore as the hand wheel is turned the levers slide radially on the fulcrum points and slidably engage the locking lugs. We therefore take advantage of the fact that the engagement or disengagement of the lugs by the levers is accomplished by a simple forward or backward movement of the slidable collar, the said collar and radial levers pivoted thereto constituting substantially a toggle mechanism.

Having thus described our invention what we claim as new and desire to secure by Letters Patent is,—

1. In apparatus of the character described, the combination of a tank having an open end and an annular series of independently-removable and adjustable locking-lugs, a removable head forming a closure for said tank, and means for securing the head to the tank, said means comprising a screw fixed centrally to the head, a rotatable follower engaging the screw, a collar loose on the follower, a series of radially-disposed levers having inner ends pivotally connected to the collar, guide lugs fixed to and projecting from the head near the periphery thereof and between which the outer ends of the levers are slidably mounted, said outer ends of the levers adapted to interlock with the lugs on the tank to secure the head to the tank, and springs acting on the outer ends of the levers to normally hold the latter against the head at the base of the spaced lugs.

2. In apparatus of the character described, the combination with a tank having an open end and a fixed ring surrounding said end, and provided with outwardly extending locking-lugs, of a head adapted to form a closure for said open end of the tank, said head having a centrally located outwardly extending screw and having pairs of spaced lugs disposed approximately around its outer edge, fulcrum-lugs between the bases of said spaced lugs, a hand wheel threaded on said screw having an extended hub-portion, a flanged collar loosely mounted on said hub-portion and provided with lugs, radially disposed levers having inner ends pivotally connected to the lugs on the collar and having their outer portions slidably guided between the said spaced lugs on the head, said levers adapted to fulcrum on the lugs at the bases of the spaced lugs on said head, a ring having an interengaging flange and-groove connection adapted to form a tight joint, and springs acting against the levers to maintain the latter in contact with the fulcrum-lugs.

3. In apparatus of the character described, the combination of a tank, a head adapted to form a closure therefor, a screw projecting centrally from said head, a follower on the screw, said follower comprising a hand-wheel and a flanged collar loose thereon, levers pivoted to said loose collar and extending radially beyond the periphery of the head, spaced lugs on the head between which the outer ends of the levers are slidably guided, fulcrum points on the head at the bases of the spaced lugs and springs at the outer portions of the said spaced lugs for holding the levers against said fulcrum points, and locking lugs on the tank engaged by the outer ends of the levers whereby the head is securely locked to the tank.

In testimony whereof we have hereunto set our hands in presence of two subscribing witnesses.

DAVID J. KELLY.
JOHN M. CALLOW.

Witnesses:
A. J. JORDON WILSON,
CARL R. PEMBROKE.